US006560368B1

(12) United States Patent
Brown et al.

(10) Patent No.: US 6,560,368 B1
(45) Date of Patent: May 6, 2003

(54) ARITHMETIC CODING AND DECODING METHODS AND RELATED SYSTEMS

(75) Inventors: Craig S. Brown, Bothell, WA (US); Thomas A. Grate, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/344,431

(22) Filed: Jun. 25, 1999

(51) Int. Cl.[7] .................................................. G06K 9/36

(52) U.S. Cl. .......................... 382/239; 382/232; 341/51; 341/107

(58) Field of Search ................................. 382/232, 239; 341/51, 107

(56) References Cited

U.S. PATENT DOCUMENTS

| | | | | |
|---|---|---|---|---|
| 4,438,452 A | * | 3/1984 | Powers | 358/13 |
| 4,516,246 A | * | 5/1985 | Kenemuth | 375/37 |
| 5,311,177 A | * | 5/1994 | Kimura et al. | 341/51 |
| 5,692,023 A | * | 11/1997 | Clark | 375/376 |
| 6,167,160 A | * | 12/2000 | Osawa | 382/247 |

FOREIGN PATENT DOCUMENTS

| | | | | |
|---|---|---|---|---|
| EP | 0381078 | * | 8/1990 | H04N/1/417 |

* cited by examiner

Primary Examiner—Anh Hong Do
(74) Attorney, Agent, or Firm—Lee & Hayes, PLLC

(57) ABSTRACT

Arithmetic coding and decoding, and compressing and decompressing methods and systems are described. In one embodiment, occurrence values are calculated that represent the number of times individual component values appear in an input stream that is to be encoded. The occurrence values are first normalized to ensure that they are all powers of 2. The occurrence values are then second normalized to ensure that the sum of all of the occurrence values is a power of 2. After normalization, encoding or compressing takes place through arithmetic techniques that utilize a range having a length equal to the normalized sum of the occurrence values. Various sub-ranges within the range are assigned to individual component values that are to be encoded. A position is defined within the range and a determination is made as to whether the position is within a sub-range that is necessary to encode an individual component value. If the position is not within the appropriate sub-range, then the position is moved, one or more encoding bits are emitted, and the new position is checked. When the position is found to be within the desired sub-range, the sub-range is expanded and the next component value of the input string is retrieved for encoding. Decoding takes place through arithmetic techniques that draw upon some of the same fundamentals of position location and sub-range expansion.

63 Claims, 10 Drawing Sheets

ARITHMETIC CODING AND DECODING METHODS AND RELATED SYSTEMS

TECHNICAL FIELD

This invention relates to arithmetic coding and decoding methods and to related systems.

BACKGROUND OF THE INVENTION

Data compression seeks to reduce the number of bits that are used to store or transmit information. This is important in today's market where there is a continuing pressure to increase the speed and volume of data transmission. Many systems for data compression use one of three techniques, or a variation thereof.

A first technique is a string matching technique. String matching techniques parse streams of data and look for repetitions of strings that have already occurred. This works well for textual data, as the words "the", "and", "or" and the like occur frequently in the English language. For binary data, string matches occur less frequently or not at all. String matching techniques do not work well on data that is random in nature, such as on data associated with audio/visual information. Compression algorithms that fall into this category include LZ77, LZ78, and LZW—which are three of the most popular compression algorithms on the market today.

A second technique is a "rate of language" technique. Rate of language techniques exploit the fact that in most data certain values occur more frequently than other values. These techniques substitute short codes for more frequently occurring values, and longer codes for less frequently occurring values. By using shorter codes more often, data can be compressed. This type of compression is normally limited to 8:1 or 16:1 compression ratios depending on implementation factors, and more realistically are in the range of 1.5:1 to 2:1. Huffman encoding algorithms use this technique.

A third technique is a "rate of change" technique. Rate of change techniques utilize the notion of looking at the first differential of plotted data. This approach recognizes that for certain types of data, the first differential is more structured than the data itself. This can be especially true for image data. The data can be encoded as the amount that the data varies from a starting point, after which this new data can be compressed by one or more of the previously-mentioned techniques. While rate of change techniques work well for binary data, they do a poor job of compressing textual data. Current implementations of this technique include the Discrete Cosine Transformation used to compress JPEG image and MPEG video files.

In the past fifteen years, arithmetic coding has emerged as a candidate to replace Huffman coding. This technique bypasses the idea of replacing an input symbol with a specific code. Rather, it replaces a stream of input symbols with a number that can comprise a single floating point output number. More bits are needed in the output number for longer, more complex messages. The output from an arithmetic coding process is a single number less than 1 and greater than or equal to 0. This single number can be uniquely decoded to create the exact stream of symbols that went into its construction. In one exemplary prior art technique, to construct the output number the symbols are assigned a set of probabilities. For example, the message "BILL GATES" would have a probability distribution like this:

| Character | Probability |
|---|---|
| SPACE | 1/10 |
| A | 1/10 |
| B | 1/10 |
| E | 1/10 |
| G | 1/10 |
| I | 1/10 |
| L | 2/10 |
| S | 1/10 |
| T | 1/10 |

Once character probabilities are known, individual symbols are assigned a range along a probability line, nominally 0 to 1. It does not matter which characters are assigned which segments of the range, as long as it is done in the same manner by both the encoder and the decoder. The nine-character symbol set used here then looks like the following:

| Character | Probability | Range |
|---|---|---|
| SPACE | 1/10 | 0.00 > = r > 0.10 |
| A | 1/10 | 0.10 > = r > 0.20 |
| B | 1/10 | 0.20 > = r > 0.30 |
| E | 1/10 | 0.30 > = r > 0.40 |
| G | 1/10 | 0.40 > = r > 0.50 |
| I | 1/10 | 0.50 > = r > 0.60 |
| L | 2/10 | 0.60 > = r > 0.80 |
| S | 1/10 | 0.80 > = r > 0.90 |
| T | 1/10 | 0.90 > = r > 1.00 |

Each character is assigned a portion of the 0 to 1 range that corresponds to its probability of appearance. Note that the character "owns" everything up to, but not including, the higher number. The most significant portion of an arithmetic-coded message belongs to the first symbols, or B, in the message "BILL GATES." To decode the first character properly, the final coded message has to be a number greater than or equal to 0.20 and less than 0.30. To encode this number, the range in which it can fall is tracked. After the first character is encoded, the low end for this range is 0.20 and the high end is 0.30. During the rest of the encoding process, each new symbol will further restrict the possible range of the output number. For example, the next character to be encoded, the letter I, owns the range 0.50 to 0.60 in the new sub-range of 0.2 to 0.3. So, the new encoded number falls somewhere in the $50^{th}$ to $60^{th}$ percentile of the currently established range. Applying this logic further restricts the number to 0.25 to 0.26. This is continued until the entire message is encoded by the final value 0.2572167752. Arithmetic coding techniques are described in a text entitled *The Data Compression Book*, $2^{nd}$ Edition, that is authored by Nelson and Gailly.

This type of arithmetic encoding has problems that are associated with the processing that must take place in order to properly encode a message. Specifically, floating point mathematics is necessary to properly encode and decode messages. This can impact the speed with which messages are compressed and decompressed. Since speed is a critical parameter in compression and decompression processing, this is undesirable.

Problems that are associated with transmitting information such as audio/video information on limited bandwidth networks continue to put pressure on the industry to develop better techniques for compressing data. For example, even with the bandwidth of 10 Mbps Ethernet networks, approximately only four audio/visual streams may be simultaneously broadcast. Many solutions today either deal with increasing the available bandwidth of a connection, or minimizing the amount of data that is necessary to be transmitted. Increased bandwidth is the most straightforward solution to the problem, but it can be cost prohibitive. Accordingly, the focus has turned to solutions that allow for the transmission of more data with less required bandwidth.

This invention arose out of concerns associated with providing improved methods and systems for encoding or compressing data, and decoding or decompressing data.

SUMMARY OF THE INVENTION

Arithmetic coding and decoding methods and compressing and decompressing methods and systems are described. In one embodiment, occurrence values are calculated that represent the number of times individual component values appear in an input stream that is to be encoded. The occurrence values are normalized a first time to ensure that they are all powers of 2. The occurrence values are then normalized a second time to ensure that the sum of all of the occurrence values is a power of 2. Encoding takes place through arithmetic coding techniques that utilize a range or line having a length that is equal to the normalized sum of the occurrence values. Various sub-ranges or segments within the range are assigned to individual component values of the input stream that is to be encoded. A starting position is defined within the range or on the line and a determination is made as to whether the position is within a sub-range or segment that is necessary to encode an individual component value. If the position is not within the appropriate sub-range or segment, then the position is moved to a new position, one or more encoding bits are emitted, and the new position is checked until a position is found to be within the desired sub-range or segment. When this occurs, the sub-range or segment is expanded and the next component value of the input string is retrieved for encoding as described above. Decoding takes place through arithmetic decoding techniques that draw upon some of the same fundamentals of position location and sub-range or segment expansion that were used to encode the input stream.

DETAILED DESCRIPTION

Overview

Figure 1:
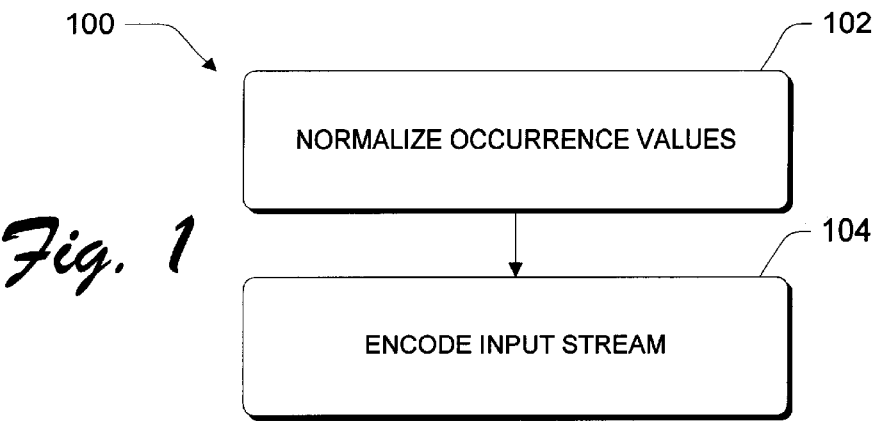
FIG. 1 is a high level flow diagram that describes processing in accordance with an embodiment of the invention.

FIG. 1 shows a flow diagram generally at 100 that illustrates a method of compressing a data stream in accordance with various embodiments of the invention. The method comprises a normalization step 102 and an encoding step 104. These steps will be described in more detail below.

Data that is to be encoded or compressed comprises an input stream of individual data components or elements. As an example, the input data stream might be a text or data string comprising individual bytes such as alphanumeric characters. In a specific example that is given later in this document, an exemplary input stream comprises the following string of characters: "AAAABBBCCD". This input stream has ten elements or components and four component values, namely "A", "B", "C", and "D". Each component value occurs within the input stream a certain number of times. The number of times a component value occurs within an input stream is referred to as the "occurrence value" for that component value. So, in this example, the component value of "A" has an occurrence value of four, "B" has an occurrence value of three, "C" has an occurrence value of two, and "D" has an occurrence value of one. The occurrence values of an input stream are calculated when an input stream is to be encoded. The occurrence values are then normalized at 102 in a manner which enables them to be encoded at 104 as will be described below in detail.

Encoding or compressing takes place through arithmetic coding techniques, utilizing the concept of a range or line having sub-segments corresponding to individual values. To explain this concept, assume that an input string has elements that are limited to two values: "A" and "B". If the input string has a length of only one character, it can be encoded in conjunction with a line such as shown in FIG. A, where the first half of the line represents the value "A" and the second half of the line represents the value "B". Assuming that the line has a length of 1, an "A" value is encoded by determining a numerical position x along the line such that $0<=x<½$, while the "B" value is encoded by a numerical position x along the line such that $½<=x<1$.

Now assume that the input string has two characters, still limited to the values "A" and "B". In this case, each of the two sub-segments identified above is further divided in order to specify the second character. Any position along the first sub-segment (from 0 to ½) of the line still indicates that the first character is "A". Any position in the first half of this sub-segment (from 0 to ¼), however, also indicates that the second character is an "A". Any position in the second half of this first sub-segment (from ¼ to ½) indicates that the second character is a "B".

The line is further sub-divided to represent strings of increasing length. Thus, the process of encoding a string involves specifying a point along the line at an increasing precision, depending on the length of the string. Higher string lengths require higher and higher precision, and further and further sub-divisions of the line.

To provide compression, the different sub-segments, representing different character values, are not all of the same length. Rather, the relative lengths of the segments are proportional to the frequency of occurrence of the character values the segments represent. Thus, if the character "A" occurs twice as frequently as the character "C", the sub-segment representing "A" is twice as long as the sub-segment representing the character "C". To determine this, the input string is analyzed ahead of time to determine character frequencies and corresponding sub-segment lengths.

In accordance with the invention, the character frequencies, also referred to herein as occurrence values, are normalized prior to using them to determine the lengths of the sub-segments. In particular, the occurrence values are determined based on actual character frequencies, then adjusted individually upwardly until they are each a power of 2. In addition, the individual occurrence values are then raised as necessary, to higher and higher powers of 2, until the total of the occurrence values is also a power of 2. Sub-segment lengths are then determined based on these normalized values rather than the actual occurrence values.

Normalization in this fashion ensures that endpoints of the different line segments can be defined as integer powers of ½. In addition to representing the endpoints of the different line segments as integer powers of ½, character values are assigned places on the line that are selected in accordance with their frequency of occurrence. More frequently occurring character values are assigned places that are easier to represent in a base ½ system. For example, the most frequently occurring character value is assigned to a line segment that includes the position of the total length of the line, e.g., the "8" position for a line length of 16. The ½ position is the easiest position to represent in the base ½ system and can be simply represented by a "1" bit. The next easiest position to represent in the base ½ system is the ¼ position, i.e. represented by "10". Thus, the next most frequently occurring character value is assigned to a segment that includes the ¼ position, i.e. "4", and so on. By assigning positions along the line in this way, compressed strings are able to be represented by the least complex emitted bit stream.

To encode or compress a character string, a starting position is defined within the range or on the line and a determination is made as to whether the position is within a sub-range or segment that is necessary to encode an individual component value. If the position is not within the appropriate sub-range or segment, then the position is moved to a new position, one or more encoding bits are emitted, and the new position is checked until a position is found to be within the desired sub-range or segment. When this occurs, the sub-range or segment is expanded and the next component value of the input string is retrieved for encoding as described above. Decoding takes place through arithmetic decoding techniques that draw upon some of the same fundamentals of position location and sub-range or segment expansion that were used to encode the input stream.

Figure 20:
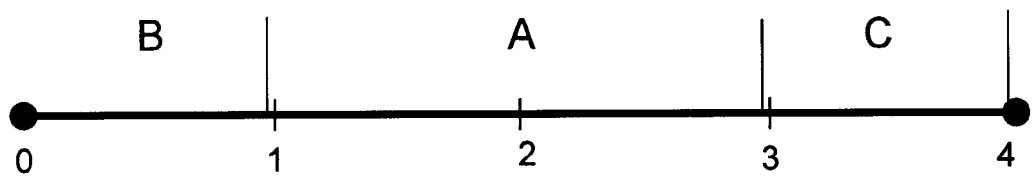
FIG. 20 is a line diagram that is useful in understanding encoding processing in accordance with one embodiment of the invention.

As a simple example, consider the following string "ABC" that is to be compressed. The occurrence values for each of these character values is "1" and the sum of the occurrence values is "3". Since "3" is not a power of 2, it is adjusted to the next highest power of 2, i.e. "4". The individual occurrence values must now be adjusted so that they equal the adjusted sum. Doing so gives the following normalized occurrence values: A=2, B=1, and C=1. A range is defined to have a length that is equal to the length of the normalized sum of the occurrence values. This is shown in FIG. 20. The character values are assigned line segment positions on the line in accordance with their occurrence frequency. Since "A" has the highest occurrence value, it is assigned a segment that includes the ½ position or "2". "B" is next assigned a segment that includes or is next to the ¼ position or "1". "C" is assigned a segment that includes the ¾ position or "3". The character values now comprise the following segments: 0<=B<1; 1<=A<3; and 3<=C<4.

An initial position is established on the line at one half of the length of the line and a "jump" variable is established at one fourth of the length of the line. The jump variable constitutes an amount by which the position on the line is moved in order to define a new position that is hopefully closer to the segment that corresponds to the character value to be encoded. A "1" bit is emitted and a check determines whether the established position is within the desired segment. If not, the position is adjusted by the jump variable and the emitted bits are manipulated to reflect the direction that the position is moved. If the position is found to be within the appropriate segment, then the segment is expanded to have a length that is equal to the original line length and the next character value is encoded. In this example, the initial position is "2" and the jump is "1". Since this position encodes the first character value of "A", the segment corresponding to "A" must be expanded.

When the line segment is expanded, a number of things take place that are discussed below in more detail. First, a new position is calculated. Second, the line segment length is doubled, along with the newly calculated position and the jump, until the line segment has a length that is equal to the length of the line. Doing this gives the following values: new position=2, and jump=2. The character values are assigned to the same segments that they previously occupied. Thus, the new line looks identical to the FIG. 20 line. The second character of the string "ABC" can now be encoded. Here, since the new position of "2" is outside the segment for "B", the position must be moved backward. To do this, the previously emitted bit is changed to a "0" and a "1" bit is emitted. The emitted bit stream now looks like: "01". A new position is calculated by taking the difference between the old position and the jump, and a new jump is calculated by dividing the old jump by 2. In this example, this gives a new position at "0". Since this position is within the segment that corresponds to "B", we have encoded the "B" value. Now, the segment for "B" is expanded in the same way that the segment for "A" was expanded. First, a new position is calculated and the line segment is expanded by factors of 2 until it has a length of "4". This also requires adjusting the position and jump. Doing so gives the following values: position=0, jump=4. Now, the third character value "C" can be encoded. Since the "0" position is below the segment for "C", the position must be moved upward along the line. To do this, a "1" bit is emitted (the bit stream now looks like "011", and the position and jump are recalculated. The new position is the sum of the old position and the jump, i.e. "4". The jump is recalculated by dividing it by 2, i.e. "2". The new position of "4" is outside of the segment for "C". Thus, the position must be moved backward on the line. To do this, the previously emitted bit is changed to a "0" and a "1" bit is emitted. The bit stream now looks like "0101". A new position is calculated by taking the difference between the old position and the jump, i.e. "2", and the jump is divided by "2". The new values are position=2 and jump=1. Since this position is below the segment for "C", the position must be moved upwardly by emitting a "1" and adding the old position and jump together. This gives a value of "3" which is within the segment for "C". Thus, the string "ABC" is encoded with the bit stream "01011".

Encoding or compressing data in this way is advantageous over other arithmetic coding techniques because of the way in which encoding takes place. By normalizing the occurrence values and their sum to powers of 2, all mathematical operations take place in integer math. This avoids the necessary overhead that accompanies arithmetic encoding techniques that require floating point mathematics. Additionally, by considering where the character values are placed on the line in relation to their frequency of occurrence, processing and compression efficiencies can be achieved by representing the encoded string in the least complex way. Other related advantages will be apparent to those of skill in the art.

Computer System

Figure 2:
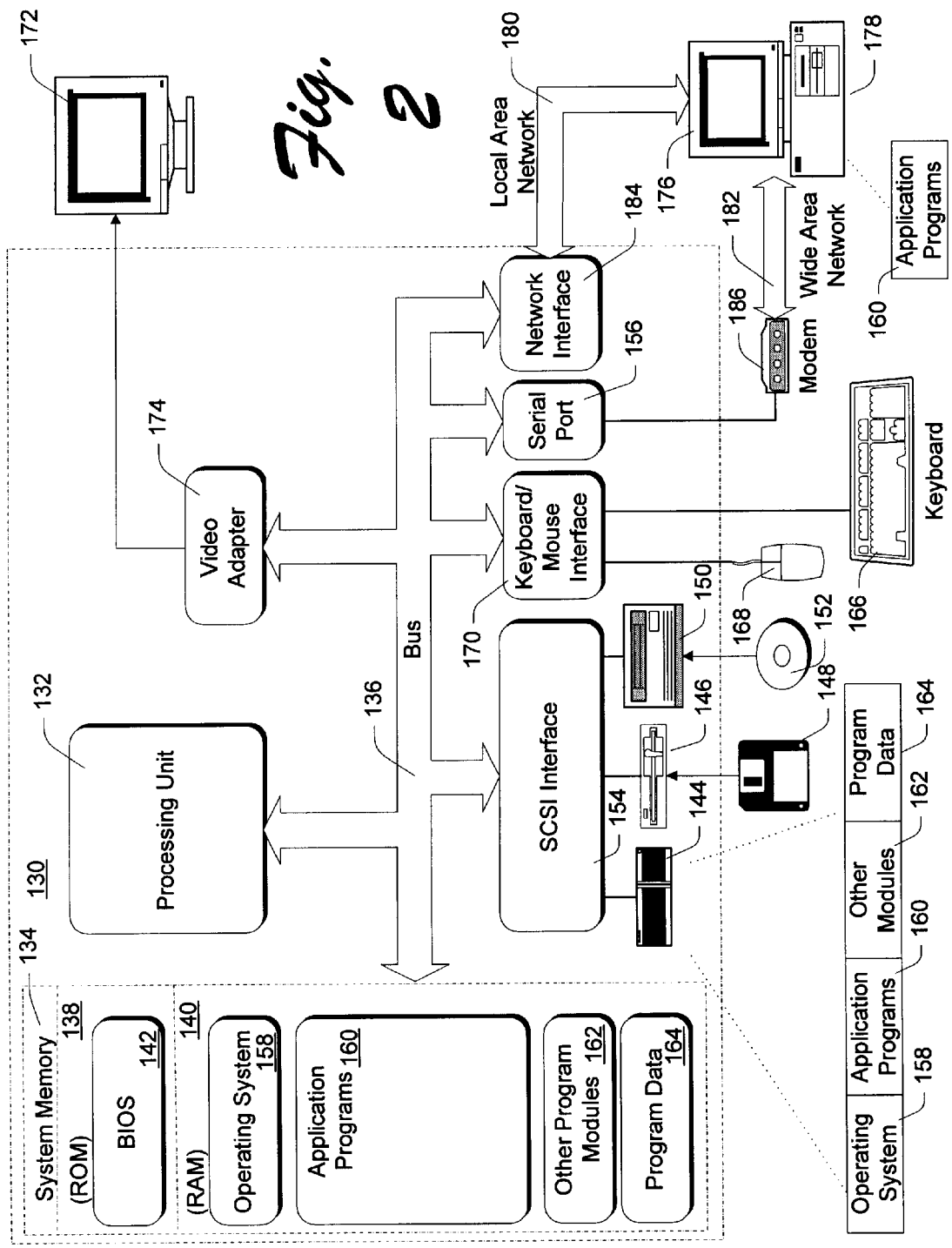
FIG. 2 is a block diagram of an exemplary computer that can be used to implement the encoding and decoding methods of the present invention.

FIG. 2 shows a general example of a desktop computer 130 that can be used in accordance with the invention. One or more computers such as the one shown can be used for encoding and decoding data as described below. The computer is preferably configured to transmit data that it has encoded or compressed, and to receive and decompress data that has been encoded or compressed.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Normalization of Occurrence Values

The occurrence values are normalized to ensure that each is a power of 2, and that the sum of the occurrence values is a power of 2. In the described embodiment, normalization takes place in a two pass process. First, the occurrence values of the individual components values are normalized to ensure that they are all powers of 2. Second, the occurrence values are again normalized to ensure that their sum is a power of 2. Hence, after the first and second normalization passes, all of the occurrence values and their sum are powers of 2.

First Normalization Pass

Figure 3:
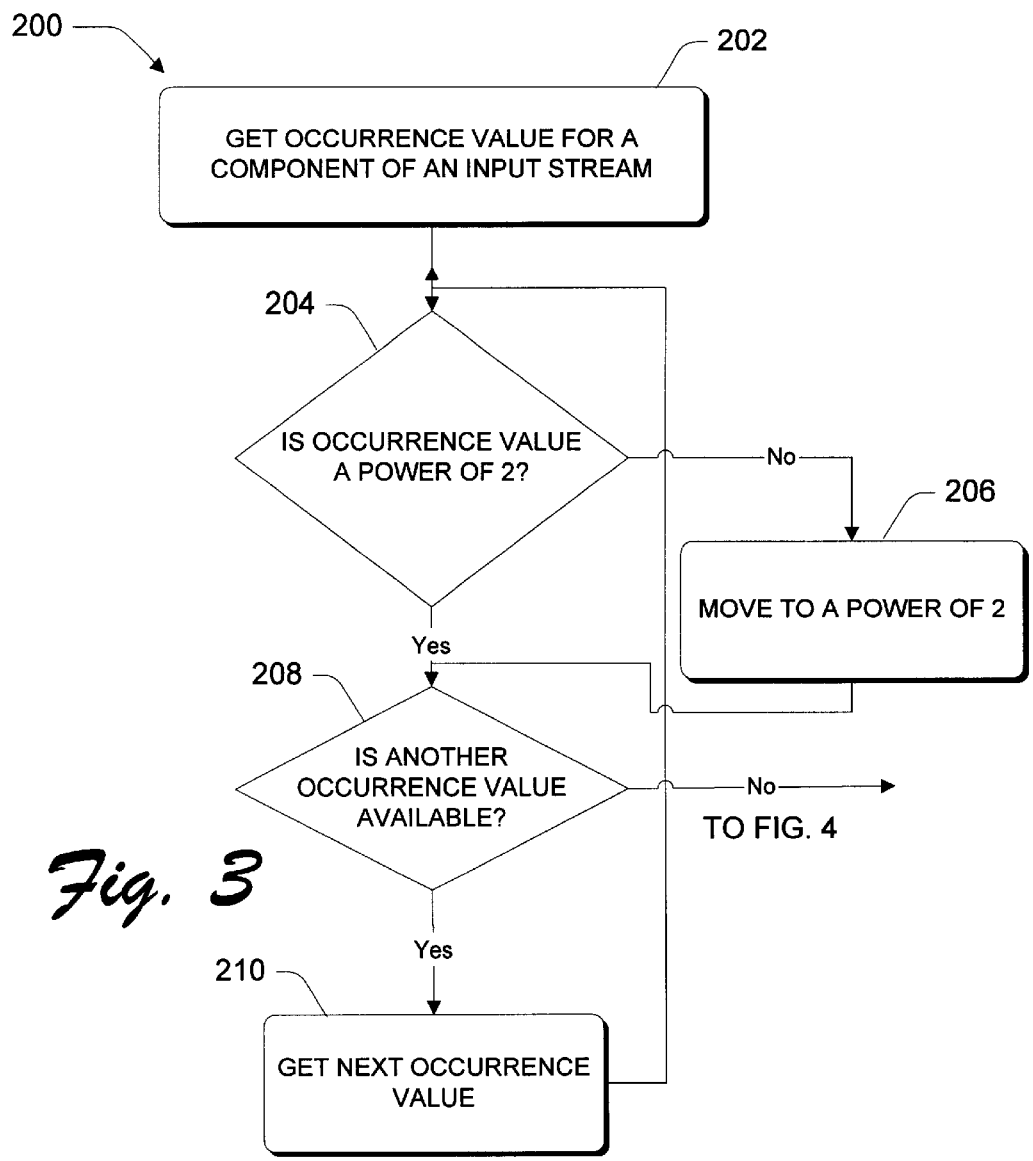
FIG. 3 is a flow diagram that describes one aspect of a normalization process in accordance with the present invention.

FIG. 3 shows a flow diagram generally at 200 that describes a first normalization pass. Normalization pass 200 ensures that all occurrence values for a given input stream are powers of 2. To assist the reader, Table 1 is provided below.

TABLE 1

| Letter | Occurrence |
|---|---|
| A | 4 |
| B | 3 |
| C | 2 |
| D | 1 |
| TOTAL | 10 |

Using the example input string "AAAABBBCCD", as discussed above, each element of the input stream is shown along with its occurrence value in the stream, and the sum or total of the occurrence values. The input string or stream can be any stream that is being transmitted, a file, a collection of data elements, and the like. The list of Table 1 sorted by occurrence values, in descending order. This ensures that the more frequently occurring values are higher in the list than the less frequently occurring values.

Once this is done, step 202 gets an occurrence value for a component value and step 204 determines whether the occurrence value is a power of 2. If the occurrence value is not a power of 2, then step 206 changes the occurrence value to the closest power of 2. In the described embodiment, this takes place by repeatedly incrementing the occurrence value until it is a power of 2. If the occurrence value is a power of 2, then step 208 determines whether there is another occurrence value available. If there is another occurrence value available, then step 210 gets the next occurrence value and loops back to step 204. If there are no other occurrence values left, then the first normalization pass branches to the second normalization pass described in FIG. 4. The result of conducting the first normalization pass on the occurrence values in Table 1 is shown in Table 2 below.

TABLE 2

| Letter | Occurrence |
|---|---|
| A | 4 |
| B | 4 |
| C | 2 |
| D | 1 |
| TOTAL | 11 |

Here, the occurrence value for "B" has been changed from a "3" (which is not a power of 2) to a "4" which is a power of 2. Now, all of the occurrence values are powers of 2. Notice, however, that the "Total" or sum has also changed to reflect to occurrence value change, i.e. it is now "11" instead of "10".

Second Normalization Pass

After all of the occurrence values have been normalized in the first normalization pass, the second normalization pass is conducted to ensure that the "Total" is a power of 2—that the individual occurrence values add up to the power of 2. In the example above, the "Total" is "11", which is not a power of 2.

Figure 4:
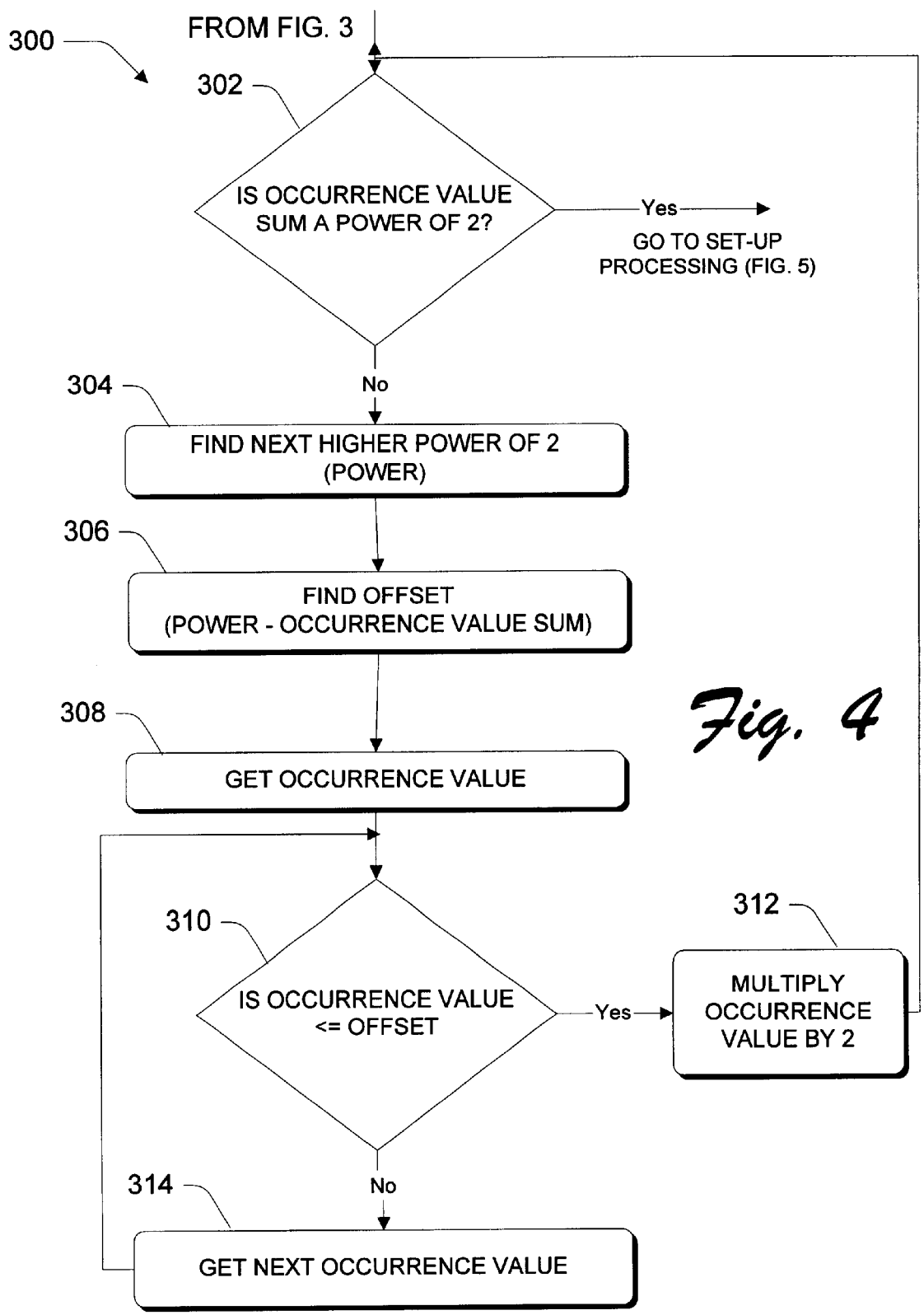
FIG. 4 is a flow diagram that describes another aspect of a normalization process in accordance with the present invention.

FIG. 4 shows a flow diagram at 300 that describes processing that takes place during an exemplary second normalization pass. Step 302 determines whether the occurrence value sum or "Total" is a power of 2. If the sum is a power of 2, then the second normalization pass branches to the encoding processing described below. If the sum is not a power of 2, then step 304 finds the next higher power of 2. In this example, the next higher power of 2 is "16". Therefore, "Total" is reassigned the value of "16" which is represented by the term "(POWER)" in step 304. The individual occurrence values do not, however, add up to "16". Rather, they add up to "11". Step 306 determines an offset that is given by the equation:

(POWER)−"Occurrence Value Sum"=offset, where "POWER" is the power of 2 that replaced the previous "Total" (i.e. 16) and the occurrence value sum is the previous occurrence value sum (i.e. 11). Using these values, the calculated offset is "5". This value tells us that we must make up "5" units in the individual occurrence values in order for the occurrence value sum to be "16". To do this, step 308 gets an occurrence value and step 310 determines whether the occurrence value is less than or equal to the calculated offset. If the occurrence value is less than or equal to the calculated offset, then step 312 multiplies the occurrence value by 2 and returns to step 302. If the occurrence value is not less than or equal to the offset, then step 314 retrieves the next occurrence value and returns to step 310.

Running a first iteration of this method for the occurrence values in Table 2 gives the values in Table 3 below:

TABLE 3

| Letter | Occurrence |
|---|---|
| A | 8 |
| B | 4 |
| C | 2 |
| D | 1 |
| TOTAL | 15 |

Here, the previous occurrence value for "A", i.e. "4", was less than the offset of "5". Therefore, "A" was multiplied by 2 to yield "8". Recomputing the "Total", such now equals "15". At this point, the method returns to step 302 and determines whether the occurrence value sum is a power of 2. If not, the method finds the next highest power of 2 (step 304) and calculates an offset (step 306). Here, the occurrence value sum is "15". Since this is not a power of 2, the next highest power of 2 is "16" and is assigned to the "Total". Therefore, computing the offset as described above, the offset is (16−15), or "1". This tells us that we must make up "1" unit in the occurrence values in order to bring the occurrence value sum to a power of 2 or, in this example, "16". Thus, the method loops back through the occurrence values (step 308) to determine whether individual occurrence values are less than or equal to the offset. Here, the first occurrence value is "8", which is not less than or equal to "1"—the method does nothing and gets the next occurrence value which, in this example, is "4". The method proceeds until it finds an occurrence value that is less than or equal to the offset. Here, the occurrence value for "D" satisfies the test because "1" is less than or equal to "1". Since the test is satisfied, step 312 multiplies it by "2" to yield the values in Table 4 below:

TABLE 4

| Letter | Occurrence |
| --- | --- |
| A | 8 |
| B | 4 |
| C | 2 |
| D | 2 |
| TOTAL | 16 |

Now, when step 302 checks to see whether the "Total" or occurrence value sum of the occurrence values is a power of 2, the test will be satisfied. The second normalization pass then branches to the set up processing and the encoding processing that is described below. During the encoding processing, the values provided by the two-pass normalization that are shown in Table 4 will be used.

Set-up Processing

Figure 5:
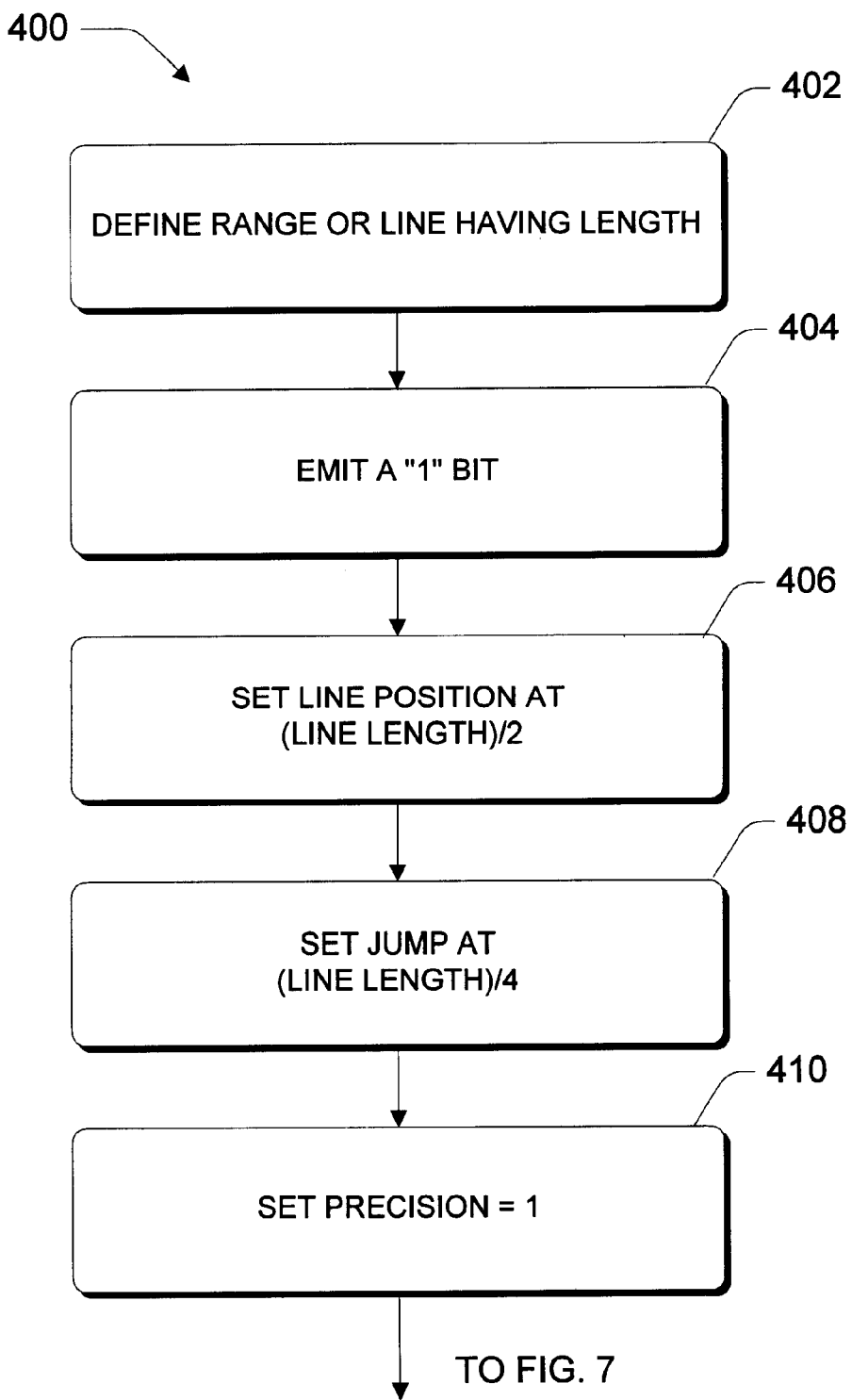
FIG. 5 is a flow diagram that describes set-up processing in accordance with one embodiment of the invention.

After the normalization processing, set-up processing takes place to set the framework within which the encoding or compression processing will take place. FIG. 5 shows a flow diagram at 400 that describes set-up processing. Step 402 defines a range or line having a length that is equal to the normalized sum of the occurrence values. It will be appreciated that the "line" that is defined is an abstraction to assist in the encoding process, and not a physical line.

In this specific example, the total possible number of values that can be encoded are 256, although only four specific values are present in the exemplary input stream, namely "A", "B", "C", and "D". When step 402 defines the range or line, each of the 256 values are assigned positions on the line or within the range. If the values do not exist in the input stream, then they are assigned a length of "0" and are not accessible during encoding. The values are placed on the line in accordance with a defined placement strategy that can either be calculated in advance or on the fly. In the described embodiment, the values are assigned to predetermined sub-ranges in accordance with the frequency that the individual values appear in the input stream.

Figure 9:
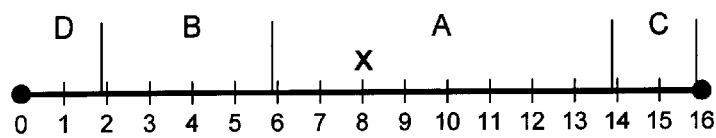
FIGS. 9–17 are line diagrams that are useful in understanding encoding processing in accordance with one embodiment of the invention.

In accordance with the invention, different segments of the line are defined using a base ½ numbering system. Specifically, in a preferred base ½ system (e.g. ½$^n$, where n>=1) bit positions represent the following values from left to right: [... 1/32, 1/16, 1/8, 1/4, 1/2]. Thus, each additional bit on the left side of a binary number represents increasing precision: the numeric value ½ can be represented by the single bit "1"; the numeric value ¼ is represented by the two bits "10"; the value ¾ is also represented by two bits "11"; the value 1/8 is represented by three bits "100"; and so on. These values can then be used to assign values to the line defined by step 402 in accordance with the frequency that the individual respective values appear in the input stream, wherein frequently occurring element or component values are assigned to numeric values requiring the fewest number of bits to represent. Hence, the easiest value to represent (which only takes one bit) is ½. The next easiest value to represent is ¼, and after that ¾ and so on. Hence, in our example, "A" is assigned to the position on the line which corresponds to a value of "8". "A" is given a length or sub-range that is equal to its normalized occurrence value of "8". "B" is assigned to the ¼ position on the line (i.e. "4") and given a length or sub-range of "4" which corresponds to its normalized occurrence value. Likewise, "C" is assigned to the ¾ position on the line (i.e. "12") and is given a length or sub-range of "2". Finally, "D" is assigned to the 1/8 position (i.e. "2") and given a length or sub-range of "2". The component values are then arranged so that their individual lengths or sub-ranges fit within the range. The individual component value sub-ranges are also referred to as a component value's line segment. The final line or range appears in FIG. 9. In the described embodiment, each component value "owns" the lower end of the sub-range in which it appears, or the line segment start (SegmentStart), but not the end of the sub-range (SegmentEnd). So, in this example and as shown in FIG. 9, "D" owns "0" and "1", but not "2". Likewise, "B" owns "2" through "5", but not "6". This enables a plurality of line segments or sub-ranges to be established that each contain $2^n$ integer values, where n is greater than or equal to "1". Accordingly, the range comprising all of the sub-ranges has a length that is equal to $2^n$, where n is greater than or equal to "1".

Once the range or line is defined as described above, step 404 emits a "1" bit and step 406 sets an initial line position or location within the range. The position is designated with an "x" in FIGS. 9–17. This establishes a position on the line or within the range from which the encoding process begins. The position can be considered as a first variable. In the described embodiment, the initial position is set at one half of the line length, or "8" in this example. Step 408 defines a second variable known as the "jump". The jump variable has a value that corresponds to an amount that an established position is to be moved. The jump variable is used to relocate the position on the line or within the range when the position is not within a desired segment or sub-range for encoding. In the described embodiment, jump is initially set at ¼ of the length of the line. Step 410 sets a precision variable to "1" which provides a way to track the number of component values being encoded and when the encoding process should be terminated.

Encoding Process

Figure 6:
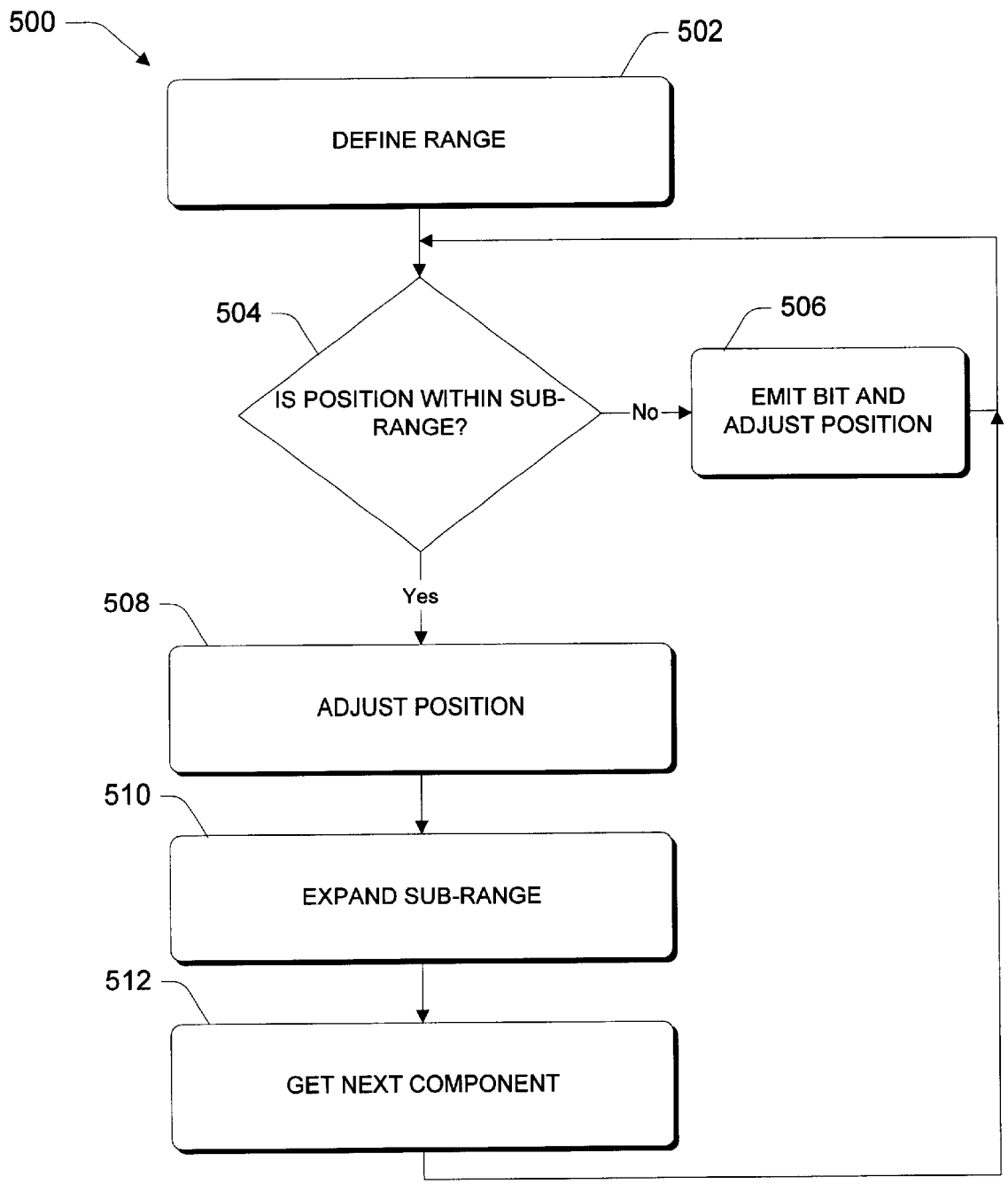
FIG. 6 is a flow diagram that describes aspects of an encoding process in accordance with one embodiment of the invention.

FIG. 6 shows a flow diagram at 500 that gives an overview of an exemplary encoding or compression process that follows the set-up processing described just above. After the range definition step at 502 (such as that described above), step 504 determines whether the established position is within a sub-range that corresponds to an individual component value that is desired to be encoded. For example, the encoding process might retrieve a first component value of an input string which happens to be a "B". If the established position corresponds to the letter "A", then we are not in the appropriate sub-range for encoding the "B". If this is the case, then step 506 produces a bitwise output, e.g. emits a bit, that is used for encoding the individual component value and adjusts the established position by moving either forward or backward on the line to a new different position. Step 506 then loops back to step 504 and checks to see whether the new position is within the desired sub-range. Adjustments are made, in this example, in integer values only. Steps 506 and 504 are repeated until the established position falls within the appropriate sub-range. When the encoding process finds a position that falls within the appropriate sub-range, step 508 then adjusts the position and step 510 expands the sub-range. The expansion takes place by expanding a segment or sub-range first length to a second length that is greater than the first length. In the described embodiment, step 510 expands the sub-range so that it has a length that is equal in magnitude to that of the original range. Step 512 then gets the next component value to be encoded and loops back to step 504 to determine whether the new established position (from step 508) is within the sub-range that corresponds to the component value that is desired to be encoded. The encoding process continues until all of the component values that make up the input stream have been encoded.

The encoding process can essentially be broken into two sub-processes. A first of the sub-processes is a process that finds a location or position on a line or within a range that corresponds to a desired component value that is to be encoded. This first sub-process comprises steps 504 and 506 above. A second of the sub-processes is a process that expands the current line segment or sub-range in order to encode the next component value. This corresponds to steps 508 and 510 above. We will now look specifically at each sub-process in the context of one specific embodiment. A specific first sub-process is shown and described in connection with FIG. 7, and a second sub-process is shown and described in connection with FIG. 8.

Figure 7:
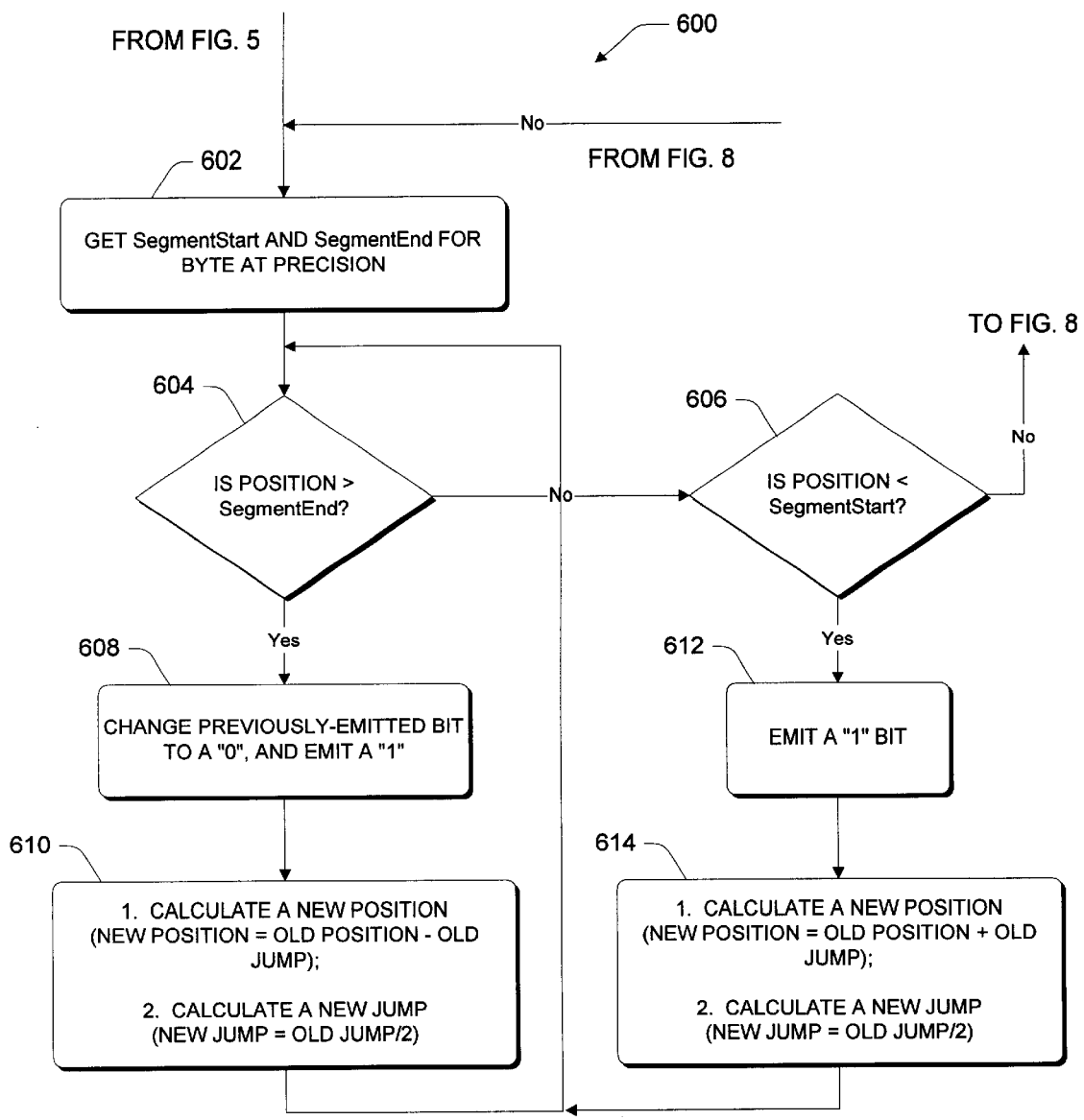
FIG. 7 is a flow diagram that describes one aspect of an encoding process in accordance with one embodiment of the invention.

Referring specifically to FIG. 7, a flow diagram is shown generally at 600 that describes processing steps of an encoding sub-process that finds a location or position on a line or within a range that corresponds to a component value that is desired to be encoded.

Step 602 retrieves the values for the beginning and end of the segment that corresponds to the component value that is being encoded. So, if the first component value is an "A", then the process retrieves the SegmentStart value for "A" (i.e. "6"), and the SegmentEnd value for "A" (i.e. "13"). Steps 604 and 606 determine whether the current position or location is within the desired segment. Specifically, step 604 checks to see whether the position or location is above the segment, in which case the position must be adjusted backward; and step 606 checks to see whether the position or location is below the segment, in which case the position must be adjusted forward. If the position is found to be within the desired segment, then the process branches to the expansion sub-process that is shown and described in FIG. 8.

If step 604 determines that the position is above the desired segment, then step 608 changes the previously-emitted bit to a "0" and emits a "1". Step 610 then calculates a new position or location and calculates a new jump. In the described embodiment, step 610 calculates a new position by subtracting the old jump from the old position. This effectively moves the position backward on the line or range. A new jump is calculated by dividing the old jump by 2. Step 610 then loops back to steps 604 and 606 to again check the new position against the desired segment or sub-range.

If, at 606, the position is below the desired segment, then step 612 emits a "1" bit and step 614 calculates a new position or location and a new jump. In the described embodiment, step 614 calculates a new position by adding the old jump to the old position. This effectively moves the position forward on the line or the range. A new jump is calculated by dividing the old jump by 2. Step 614 then loops back to steps to 604 and 606 to again check the position against the desired segment or sub-range.

The bits that are emitted define an output stream that encodes the input stream. The bits are emitted in a manner that corresponds to movement of the location within the range or on the line until the desired position is found. During encoding, the output stream is modified as described above. Movement takes place preferably through integer value movements, and even more preferably through even integer movement values.

Figure 8:
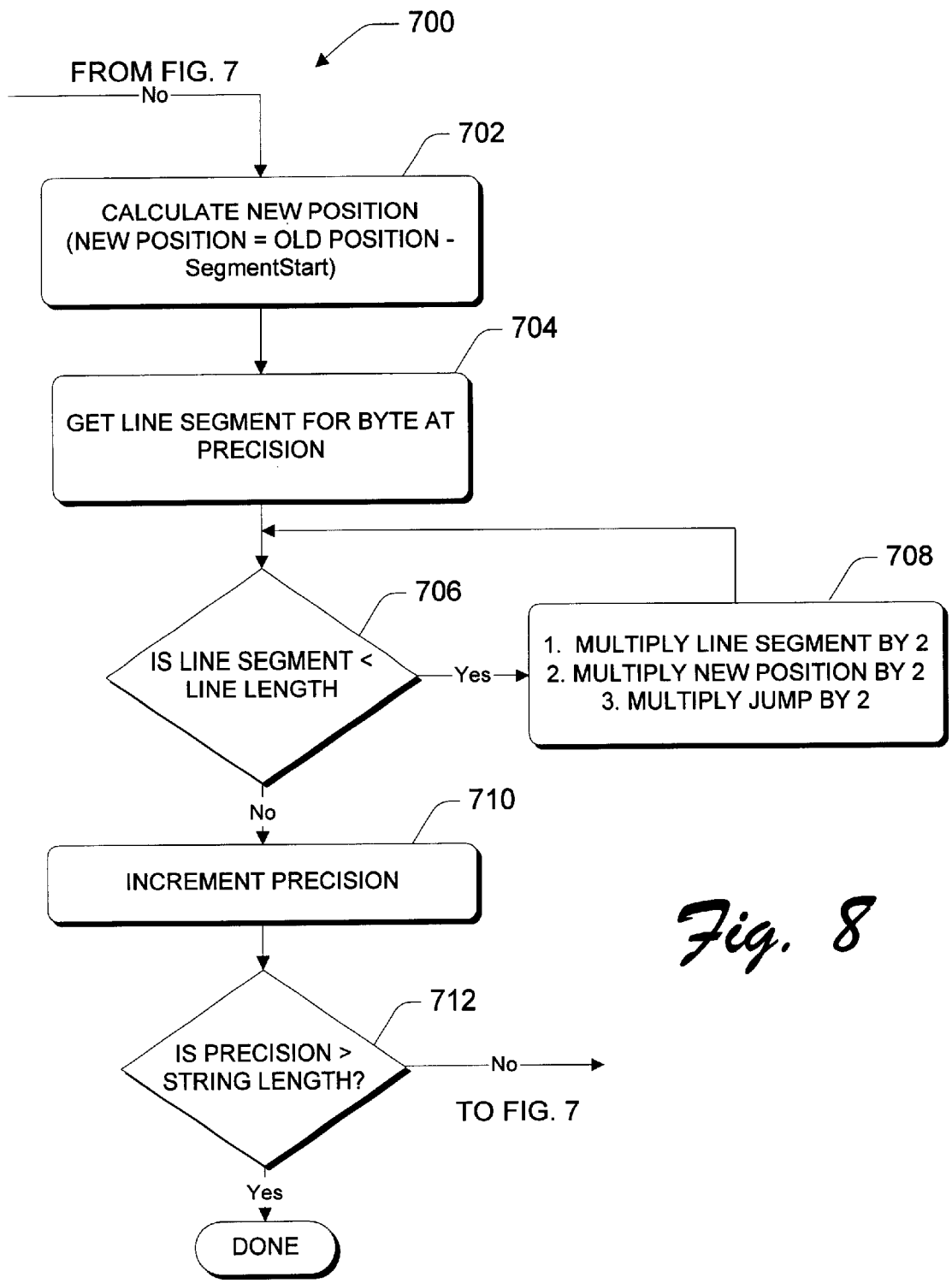
FIG. 8 is a flow diagram that describes expansion processing in accordance with one embodiment of the invention.

If an established position is found to be within the desired sub-range or segment, then the process branches to the expansion sub-process of FIG. 8. FIG. 8 shows a flow diagram at 700 that describes processing in accordance with the expansion sub-process. The expansion sub-process expands the associated segment or sub-range when a position is found that falls within the segment or sub-range that corresponds to the component value to be encoded. Step 702 recalculates a new position by subtracting the SegmentStart value from the old position. The SegmentStart value corresponds to the beginning of the segment in which the current position is located. This will become more apparent below in connection with the example that is described. Step 704 retrieves the line segment or sub-range for the particular component value being processed at the current precision. Step 706 determines whether the line segment is less in length than the original line length. In our example, the original line length is "16". So, if the segment for the letter "A" is retrieved, then that segment length is only "8". Step 708 makes sure than the line segment is expanded to have a length that is equal to the original line length. In the described embodiment, it does so in increments by multiplying the line segment by a factor of 2, whereafter step 706 checks whether the line segment has a length less than the original line. In connection with expanding the segment or sub-range, step 708 also expands the position and the jump by amounts that are commensurate with the amount by which the segment or sub-range is expanded. In the described embodiment, expansion takes place only by factors of 2.

When the line segment, position, and jump have been expanded, step 710 increments the precision variable and step 712 checks to see whether the end of the input stream has been reached. If the precision value is greater than the input string length, then the encoding process is done. If the encoding is not done, then step 712 loops back to step 602 (FIG. 7) in order to encode the next component value. This process continues until all of the component values have been encoded.

Encoding Example

To assist the reader in understanding the encoding process just described, the following elementary example is given. In this example, the text input string "AAAABBBCCD" is to be encoded. During this example, reference will be made to FIGS. 7 and 8 that describe the processing that takes place, and to FIGS. 9–17 that show exemplary lines or sub-ranges and the corresponding positions provided by the processing of FIGS. 7 and 8.

The processing described just below picks up after the set-up processing described in FIG. 5. Accordingly, at this point the following values have been set and we are going to encode the first "A" in our input string:

| | |
|---|---|
| Emitted Bit(s) | 1 |
| Position | 8 |
| Jump | 4 |
| Precision | 1 |

FIG. 9 shows the current position of "8" on illustrated line. The encoding procedure of FIG. 7 determines whether the current position falls within the sub-range that corresponds to "A" (steps 604 and 606). If it does not, then the current position must be moved, either down or up so that the position falls within the assigned sub-range for "A". Here, the current position is "8". The current position falls within the sub-range that is needed for the letter "A". The process then branches to FIG. 8's expansion process.

First, step 702 calculates a new position which, in this example is found by subtracting the SegmentStart for "A", i.e. "6" from the old position "8". This gives a value of "2". Step 704 retrieves the line segment for "A", and steps 706 and 708 respectively check to ensure that the segment has a length that is equal to the original line length of "16", and if not, expands the segment, the position and the jump accordingly. Subsequently, when the desired segment length has been achieved, step 710 increments the precision and step 712 checks the precision against the string length. At this point, the first "A" has been encoded and the following values exist:

| Emitted Bit(s) | 1 |
| --- | --- |
| Position | 4 |
| Jump | 8 |
| Precision | 2 |

Figure 10:
Figure 11:
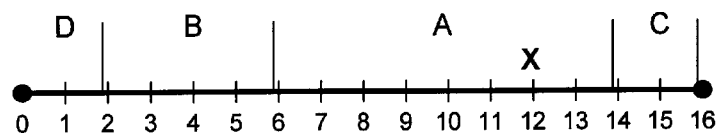

Step 712 now returns to step 602 (FIG. 7) to encode the next component value which is the second "A". FIG. 10 shows a new line with the new position. From the FIG. 10 line, we know that we need to be in the range of "A" in order to encode it. Step 606 determines that the position is below the SegmentStart for "A". This means that the position must be adjusted or moved forward. To do this, step 612 emits a "1" bit and step 614 calculates a new position and a new jump. This gives the values shown just below and on the FIG. 11 line:

| Emitted Bit(s) | 11 |
| --- | --- |
| Position | 12 |
| Jump | 4 |
| Precision | 2 |

Step 614 then loops back to steps 604 and 606 and checks to see if the new position is within the desired segment or sub-range. Here, since we are trying to encode the second "A", the sub-range in which the position needs to fall is between "6" and "14", including the "6" but not the "14". Since "12" is between "6" and "14", the emitted bits "11" can encode the "AA" and processing branches to expand the line segment as described above in connection with FIG. 8.

After the line segment is expanded as described in FIG. 8, the following values exist:

| Emitted Bit(s) | 11 |
| --- | --- |
| Position | 12 |
| Jump | 8 |
| Precision | 3 |

Figure 12:
Figure 13:
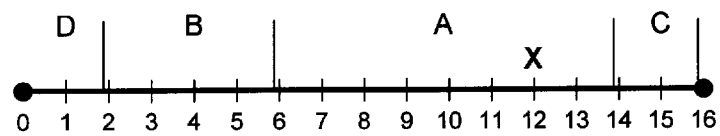
Figure 14:
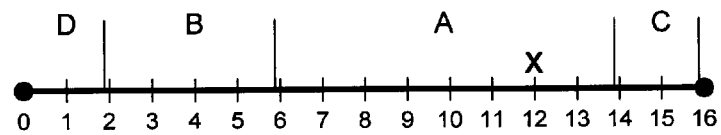
Figure 15:
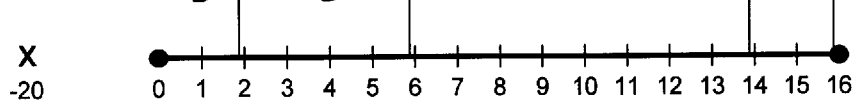
Figure 16:
Figure 17:

Here, after step 708 expands the line segment, the position, and the jump, step 710 increments the precision, and step 712 checks the precision against the string length. If the precision is not greater than the string length, then step 714 loops back to get the next text character or component value at 602 in the string and uses the new line computed as above and as shown in FIG. 12.

At this point, we have encoded "AA" of our string "AAAABBBCCD". Looping back to step 602 picks up the third "A" in our string. Here, the current position of 12 (FIG. 12) falls within the sub-range that corresponds to "A". Thus, the method branches to the expansion processing described in FIG. 8. Processing through the steps of FIG. 8 gives the following values:

| Emitted Bit(s) | 11 |
| --- | --- |
| Position | 12 |

-continued

| Jump | 16 |
| --- | --- |
| Precision | 4 |

Here, the line is expanded and the appropriate values are multiplied (step 708), the precision is incremented (step 710) and checked against the string length (step 712). If the precision is not greater than the string length, then the process loops back to step 602 and gets the next text character value in the string and uses the new line that is set forth in FIG. 13. At this point we have encoded the third "A" in our string "AAAABBBCCD". When the method loops back, it picks up the fourth "A".

Since the line position is 12 (FIG. 13) we are in the range designated to encode "A". Therefore, no bits need to be emitted and the emitted bits "11" encode "AAAA". Processing then branches to FIG. 8 to expand the line segment corresponding to "A". Processing in FIG. 8 yields the values shown below and in FIG. 14:

| Emitted Bit(s) | 11 |
| --- | --- |
| Position | 12 |
| Jump | 32 |
| Precision | 5 |

At this point, we have encoded "AAAA" with the emitted bits "11". The next text character value in the string is "B". Since the current position is above the segment for "B" (FIG. 14), the position must be moved backward. This is done by steps 608 and 610. Step 608 changes the previously emitted bit to a "0" and emits a "1". In this example, the emitted bits "11" from above first go to "10", and then to "101". Step 610 then calculates a new position of "−20", and a new jump of 16. These are set forth in the table below and in FIG. 15:

| Emitted Bit(s) | 101 |
| --- | --- |
| Position | −20 |
| Jump | 16 |
| Precision | 5 |

Steps 604 and 606 again determine whether the new position is within the desired sub-range. If not, the position is moved or adjusted until the correct sub-range is found. Since the current position is below the desired sub-range, it must be moved forward as dictated by step 606. Accordingly, step 612 emits a "1" bit and step 614 recalculates a new position and a new jump as described. Doing so yields the values shown just below and in FIG. 16:

| Emitted Bit(s) | 1011 |
| --- | --- |
| Position | −4 |
| Jump | 8 |
| Precision | 5 |

Here, the position of "−4" is still not in the desired sub-range. Accordingly, the method loops back to steps 604 and 606. The position must again be moved forward as dictated by step 606. Doing so yields the values shown just below and in FIG. 17:

| Emitted Bit(s) | 10111 |
|---|---|
| Position | 4 |
| Jump | 4 |
| Precision | 5 |

At this point, the new position falls within the desired range for "B" and hence we have successfully encoded "AAAAB" with the emitted bits "10111".

For the sake of brevity, the remainder of the processing to encode the string "AAAABBBCCD" is not described. Following the processing through to completion, however, yields the output stream "101101101011111".

When the input string has been encoded as described above, it can be place on a computer readable medium as an output data stream and/or transmitted from one computer or processor to the next computer or processor. The receiving computer or processor is preferably configured to decode the encoded data stream.

Decoding Process

Figure 18:
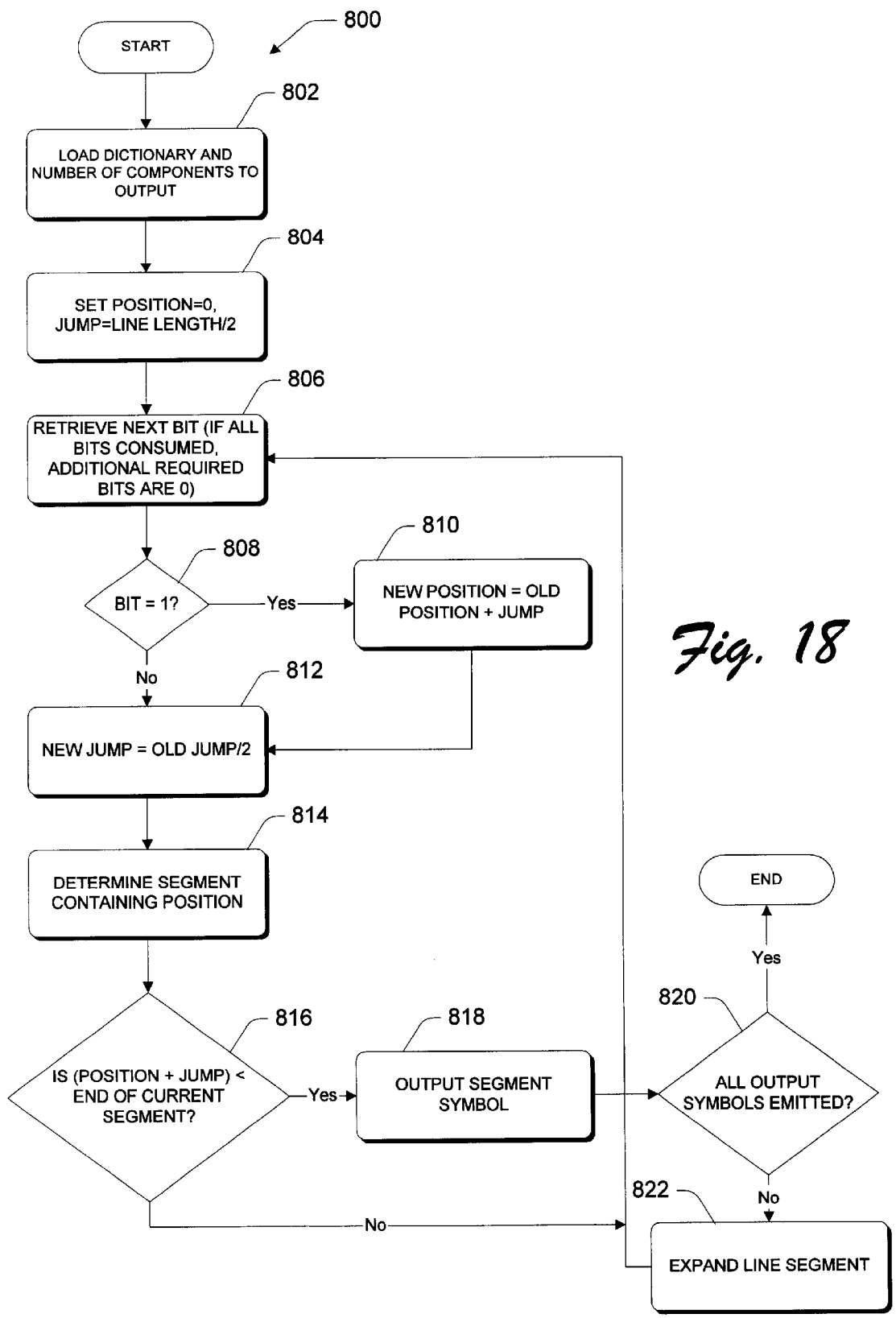
FIG. 18 is a flow diagram that describes decoding processing in accordance with one embodiment of the invention.
Figure 19:
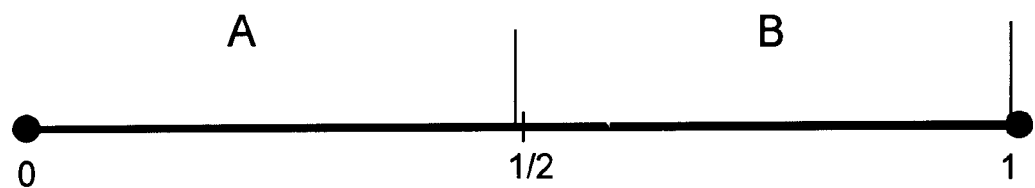
FIG. 19 is a line diagram that is useful in understanding encoding processing in accordance with one embodiment of the invention.

FIG. 18 shows a flow diagram generally at 800 that describes decoding or decompression processing that can decompress an input stream that is compressed as described above. Step 802 loads a so-called dictionary and the number of component values to be output. The dictionary represents the component values that are encoded in the encoded data stream as well as their normalized occurrence values. This enables the decompression process to use the same range or line, and corresponding sub-ranges or segments that were originally used to encode or compress the input stream. The dictionary is preferably transmitted with the compressed data. Step 804 is the set-up processing that takes place for decompression and includes setting the initial position to "0", and setting the jump to one-half of the length of the line. Step 806 retrieves the first or next bit. If all of the bits are consumed, then additional required bits are set to "0". Step 808 determines whether the bit is a "1". If the bit is a "1", then step 810 calculates a new position and branches to step 812 which calculates a new jump. If the bit is not a "1", then step 808 branches to step 812. Step 814 determines the segment containing the current position. Step 816 then determines whether the sum of the current position and the jump is less than the end of the current segment. If not, then step 816 loops back to step 806. If so, then step 818 outputs the symbol or component value associated with that segment and step 820 determines whether all of the symbols or component values have been output. If all of the symbols or component values have not been output, then step 822 expands the segment as described in FIG. 8 and then loops back to step 806. Processing continues until all of the bits have been expanded or decoded.

Advantages of the present invention include the compression rates than can be achieved for very large blocks of data. Various embodiments compress data while using a minimal amount of emitted bits. Unlike other compression procedures, the efficiency of the various embodiments actually increase as the blocks of data grow in size. Encoding and decoding can take place in real time which further increases the environments in which the invention can be used. Other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of compressing an input stream comprising:

calculating occurrence values that represent the number of times individual component values appear in an input stream;

normalizing the occurrence values to ensure that all of the occurrence values are powers of 2; and normalizing the occurrence values to ensure that the sum of all of the occurrence values is a power of 2.

2. The method of claim 1 further comprising after said normalizing steps, compressing the input stream with arithmetic encoding using the normalized occurrence values.

3. The method of claim 1 further comprising:

defining a range having a length that is equal to the normalized sum of the occurrence values;

assigning individual component values of the input stream to different sub-ranges within the range; and
  a) determining whether a defined position is within a sub-range that corresponds to an individual component value that is desired to be encoded and, if not,
  b) producing a bitwise output that is used for encoding the individual component value, and
  c) adjusting the defined position to a different position, and repeating steps a) and b) until a position is found that is within the sub-range that corresponds to the individual component value that is desired to be encoded; and after the position is found that is within the sub-range, expanding the sub-range until it has a length that is equal in magnitude to that of the range; and repeating steps a), b), and c) until all of the individual component values that make up the input stream have been encoded.

4. A method of compressing an input stream comprising:

normalizing occurrence values that represent the number of times individual component values appear in the input stream so that normalized occurrence values and their sum are powers of 2; and compressing the input stream with arithmetic encoding using the normalized occurrence values.

5. The method of claim 4 further comprising outputting the compressed input stream onto a computer-readable medium.

6. The method of claim 4 further comprising:

defining a line having a length that corresponds to the normalized sum of the occurrence values;

assigning individual component values that appear in the input stream to different line segments of the line;

establishing a position on the line; and wherein said compressing comprises:
  determining whether an established position on the line falls within a segment that corresponds to a component value of the input stream that is to be encoded; and
  if the position on the line does not fall within the segment that corresponds to the component value that is to be encoded, adjusting the established position on the line by moving either forward or backward on the line, said adjusting taking place until the position falls within the segment.

7. The method of claim 6, wherein the line segments each contain $2^n$ integer values, where "n" is greater than or equal to 1.

8. The method of claim 7, wherein the adjusting of the position on the line comprises doing so in integer values only.

9. The method of claim 6 further comprising:
defining a first variable having a value that corresponds to the position that is established on the line;
defining a second variable having a value that corresponds to an amount that an established position is to be moved; and
wherein said compressing comprises at least one of:
(a) emitting a defined bit in connection with a move forward on the line; and
(b) changing a previously-emitted bit and emitting a defined bit in connection with a move backward on the line.

10. The method of claim 9, wherein in connection with a move forward on the line, recalculating the first variable to provide a new established position by adding the second variable to the established position, and reducing the second variable.

11. The method of claim 9, wherein in connection with a move backward on the line, recalculating the first variable to provide a new established position by subtracting the second variable from the established position, and reducing the second variable.

12. The method of claim 4 further comprising:
defining a line having a length that corresponds to the normalized sum of the occurrence values; and
wherein said compressing comprises expanding at least one line segment of the line having a first segment length so that it has a second segment length that is greater than the first segment length.

13. The method of claim 12 further comprising:
defining a first variable having a value that corresponds to a position on the line;
defining a second variable having a value that corresponds to an amount that an established position on the line is to be moved; and
wherein said expanding of said at least one line segment comprises also expanding the first and second variables by an amount that is commensurate with an amount by which the line segment is expanded.

14. The method of claim 12, wherein said expanding comprises expanding said at least one line segment so that it has a length that is equal to the length of the line.

15. The method of claim 4, wherein said compressing comprises encoding said input stream as a plurality of bits which represent values in a base ½ system.

16. The method of claim 4 further comprising:
defining a line having a length that corresponds to the normalized sum of the occurrence values;
assigning individual component values that appear in the input stream to different line segments of the line;
establishing a position on the line;
defining a first variable having a value that corresponds to the position that is established on the line;
defining a second variable having a value that corresponds to an amount that an established position is to be moved;
wherein said compressing comprises:
determining whether the established position on the line falls within a line segment that corresponds to a component value of the input stream that is to be encoded, and:
if the established position is below the line segment, emitting a "1" bit in connection with a move forward on the line and recalculating the first variable by adding the second variable to the established position to provide a new established position; and then recalculating the second variable by dividing it by a power of 2; and
if the established position is above the line segment, changing a previously-emitted bit to a "0" and emitting a "1" bit in connection with a move backward on the line and recalculating the first variable by subtracting the second variable from the established position to provide a new established position, and then recalculating the second variable by dividing it by a power of 2;
repeating said determining step until the new established position on the line falls within the line segment; and
when the new established position falls within the line segment:
expanding said line segment so that it has a length equal to the length of the line; and
expanding the first and second variables by an amount commensurate with an amount by which the line segment is expanded; and compressing a next component value until there are no more component values to compress.

17. An arithmetic coding method comprising:
defining a range having a length that is equal to $2^n$, where "n" is greater than or equal to 1;
assigning individual component values that comprise an input stream that is to be encoded to sub-ranges of the range;
encoding a first component value of the input stream by emitting a particular bit when a defined position within the range does not fall within the sub-range that is assigned for that component value; and
after encoding the first component value, expanding the sub-range assigned for that particular component value so that the sub-range now has a length that is equal in magnitude to the length of the range.

18. The arithmetic coding method of claim 17, wherein the assigning of the individual component values comprises assigning the component values to predetermined sub-ranges.

19. The arithmetic coding method of claim 17, wherein the assigning of the individual component values comprises assigning the component values to predetermined sub-ranges in accordance with the frequency that the individual component values appear in the input stream.

20. The arithmetic coding method of claim 17, wherein the assigning of the individual component values comprises assigning the component values to predetermined sub-ranges in accordance with values that are associated with the frequency that the individual respective component values appear in the input stream.

21. The arithmetic coding method of claim 20, wherein said values that are associated with the frequency are all powers of ½.

22. The arithmetic coding method of claim 17, wherein said encoding comprises:
establishing a position within the range;
determining whether the position falls within a sub-range that corresponds to an individual component value that is desired to be encoded;
if the established position does not correspond to a desired sub-range, modifying an output stream that represents the encoded input stream and moving the established position to a different established position within the range; and repeating said determining and modifying steps until the position within the range falls within the desired sub-range.

23. The arithmetic coding method of claim 22 further comprising encoding a plurality of component values of the input stream.

24. The arithmetic coding method of claim 17, wherein said expanding comprises expanding the sub-range by at least a factor of 2.

25. The arithmetic coding method of claim 17, wherein said expanding comprises expanding the sub-range only by factors of 2.

26. The arithmetic coding method of claim 17, wherein said encoding comprises encoding a plurality of component values of the input stream to have a value in a base ½ system.

27. An arithmetic coding method comprising:
defining a range that extends from 0 to $2^n$, where "n" is greater than or equal to 1;
establishing a plurality of sub-ranges within the range, wherein each sub-range contains an even number of integer values;
assigning each component value of an input stream that is to be encoded to an individual sub-range based upon the frequency that the individual component value appears in the input stream;
for each component value comprising the input stream, encoding the component value by locating a sub-range that corresponds to the component value, and doing one or more of the following:
emitting one or more bits; and
expanding the sub-range so that it has a magnitude that equals that of the range.

28. The arithmetic coding method of claim 27, wherein said locating comprises:
defining a starting location within the range; and
if the starting location is below a desired sub-range, moving the starting location up through the range; and
if the starting location is above a desired sub-range, moving the starting location down through the range; and
wherein the bits that are emitted correspond to movement of the starting location within the range.

29. The arithmetic coding method of claim 28, wherein said moving comprises moving the starting position by integer values.

30. The arithmetic coding method of claim 28, wherein said moving comprises moving the starting position only by integer values.

31. The arithmetic coding method of claim 28, wherein said moving comprises moving the starting position by even integer values.

32. The arithmetic coding method of claim 27, wherein the expanding of the sub-range comprises expanding it by a factor of 2 until it has a magnitude that equals that of the range.

33. The arithmetic coding method of claim 27 further comprising outputting an encoded stream onto a computer-readable medium.

34. The arithmetic coding method of claim 27 further comprising transmitting an encoded stream via a transmission medium.

35. A decoding method comprising decoding an encoded stream that has been encoded in accordance with the method of claim 27.

36. A computer that is programmed to compress an input stream in accordance with the following method:
normalizing occurrence values of individual component values in an input stream so that the occurrence values and their sum are powers of 2;
defining a range that extends from 0 to $2^n$, where "n" is greater than or equal to 1;
establishing a plurality of sub-ranges within the range, wherein each sub-range contains an even number of integer values;
assigning each component value of the input stream to an individual sub-range based upon the frequency that the individual component value appears in the input stream;
for each component value comprising the input stream:
defining a starting location relative to the range;
if the starting location is not within a sub-range that corresponds to a component value that is to be encoded, emitting at least a bit and moving the starting location either up through the range or down through the range, said emitting and said moving taking place until the starting location is within the desired sub-range to provide a new starting location; and
if the starting location is within the desired sub-range, expanding the sub-range by factors of 2 until the sub-range has a magnitude that equals that of the range and, for additional component values of the input stream, repeating said (a) defining of the starting location, (b) emitting, (c) moving and (d) expanding steps until all individual component values of an input stream have been compressed.

37. The computer of claim 36, wherein the computer is configured to transmit a compressed stream to another computer.

38. The computer of claim 36, wherein the computer is part of a system that includes at least one other computer configured to receive and decompress a compressed input stream.

39. A stream of digital data that represents an input stream that has been compressed in accordance with the following method:
defining a range that extends from 0 to $2^n$, where "n" is greater than or equal to 1;
establishing a plurality of sub-ranges within the range, wherein each sub-range contains an even number of integer values;
assigning each component value of an input stream that is to be compressed to an individual sub-range based upon the frequency that the individual component value appears in the input stream;
for each component value comprising the input stream, compressing the component values by locating a sub-range that corresponds to the component value and doing one or more of the following:
emitting one or more bits; and
expanding the sub-range so that it has a magnitude that equals that of the range.

40. The stream of digital data of claim 39, wherein said locating comprises:
defining a starting location relative to the range;
moving the starting location up through the range if the starting location is below a desired sub-range;
moving the starting location down through the range if the starting location is above the desired sub-range, and
wherein the bits that are emitted correspond to movement of the starting location within the range.

41. The stream of digital data of claim 39, wherein said data is resident on a computer readable medium.

42. The stream of digital data of claim 39, wherein said data is being transmitted over a communication link for receipt by a computer.

43. An arithmetic coding method comprising:

defining a range having a length that is equal to a power of 2;

dividing the range into a plurality of equal length subranges, wherein each subrange corresponds to a component value that can be encoded;

assigning a most significant bit to a subrange that encompasses a position within the range that is one half of the length of the range; and assigning lesser significant bits to other subranges.

44. The arithmetic coding method of claim 43, wherein the bits that are assigned to the subranges correspond to values in a base ½ system.

45. An arithmetic coding method comprising:

defining a range having a length that is equal to a power of 2;

dividing the range into a plurality of equal length subranges, wherein each subrange corresponds to a component value that can be encoded; and expanding at least one of the subranges to have a length that is equal to the length of the range.

46. The arithmetic coding method of claim 45, wherein said expanding comprises expanding a plurality of subranges.

47. An arithmetic coding normalization method comprising:

calculating occurrence values for individual component values of an input stream that is to be encoded, the occurrence values representing the number of times an individual component value occurs in the input stream;

determining whether each occurrence value is a power of 2; and if an occurrence value is not a power of 2, reassigning a value to the occurrence value that is a power of 2.

48. The arithmetic coding normalization method of claim 47 further comprising:

summing the occurrence values to provide an occurrence value sum;

determining whether the occurrence value sum is a power of 2; and if the occurrence value is not a power of 2, adjusting individual occurrence values so that the occurrence value sum is a power of 2.

49. The arithmetic coding normalization method of claim 48, wherein said summing takes place after all of the occurrence values have been initially normalized to powers of 2.

50. An arithmetic decoding method comprising:

receiving a bit stream that encodes data comprising individual component values of a string;

defining a range having a defined length, wherein the individual component values are assigned to individual sub-ranges of the range;

establishing a position within the range and a jump value that is associated with an amount that the position can be moved within the range;

checking a bit stream bit and recalculating the position if the bit has a predetermined value;

recalculating the jump value;

finding the sub-range that contains the position;

determining whether a calculated value is less than the end of the found sub-range; and if the calculated value is less than the end of the found sub-range, outputting a component value that corresponds to that sub-range, otherwise retrieving a next bit.

51. The arithmetic decoding method of claim 50, wherein the range has a length that is equal to $2^n$, where n>1.

52. The arithmetic decoding method of claim 50, wherein each sub-range contains only integer values.

53. The arithmetic decoding method of claim 50, wherein the range has a length that is equal to $2^n$, where n>1, and wherein each sub-range contains only integer values.

54. The arithmetic decoding method of claim 50, wherein each sub-range contains only an even number of integer values.

55. The arithmetic decoding method of claim 50, wherein the range has a length that is equal to $2^n$, where n>1, and wherein each sub-range contains only an even number of integer values.

56. The arithmetic decoding method of claim 50, wherein said calculated value is equal to the sum of the position and the jump value.

57. The arithmetic decoding method of claim 50 further comprising expanding the found sub-range to define a new range having a length, and wherein the individual component values are assigned to individual sub-ranges of the new range.

58. The arithmetic coding method of claim 57, wherein the length of the new range is greater than 1.

59. The arithmetic coding method of claim 57, wherein the length of the new range is equal to $2^n$, where n>1.

60. An arithmetic decoding method comprising:

a) receiving a bit stream that encodes data comprising individual component values;

b) defining a range having a length that is equal to $2^n$, where n>1, and wherein the individual component values are assigned to individual sub-ranges of the range, wherein each sub-range has a length that is equal to $2^n$, where n>1;

c) establishing a position within the range and a jump value that is associated with an amount that the position can be moved within the range;

d) checking a bit stream bit and recalculating the position if the bit has a predetermined value;

e) recalculating the jump value;

f) finding the sub-range that contains the position;

g) determining whether a calculated value is less than the end of the found sub-range, and if the calculated value is less than the end of the found sub-range, outputting a component value that corresponds to that sub-range and expanding the found sub-range to define a new range having a length, and wherein the individual component values are assigned to individual sub-ranges of the new range; and retrieving a next bit and repeating steps d)–g) until an input stream that corresponds to the bit stream has been decoded.

61. The arithmetic decoding method of claim 60, wherein said expanding of the sub-range also comprises expanding the position and the jump value by an amount that is commensurate with an amount that the sub-range is expanded.

62. The arithmetic decoding method of claim 60, wherein said expanding of the sub-range comprise doing so only by factors of 2.

63. The arithmetic decoding method of claim 60, wherein said expanding of the sub-range also comprises expanding the position and the jump value by an amount that is commensurate with an amount that the sub-range is expanded, said expanding comprising doing so only by factors of 2.

* * * * *

UNITED STATES PATENT AND TRADEMARK OFFICE
CERTIFICATE OF CORRECTION

PATENT NO. : 6,560,368 B1
DATED : May 6, 2003
INVENTOR(S) : Brown et al.

It is certified that error appears in the above-identified patent and that said Letters Patent is hereby corrected as shown below:

Column 5,
Line 37, insert -- ½ -- between "the" and "position".

Column 11,
Line 58, insert -- ½ -- between "the" and "position".

Signed and Sealed this

Second Day of September, 2003

JAMES E. ROGAN
*Director of the United States Patent and Trademark Office*